Sept. 24, 1963  P. NASH  3,105,152
INSPECTION OF SHEET MATERIALS BY PHOTOELECTRIC MEANS
Filed Jan. 8, 1960
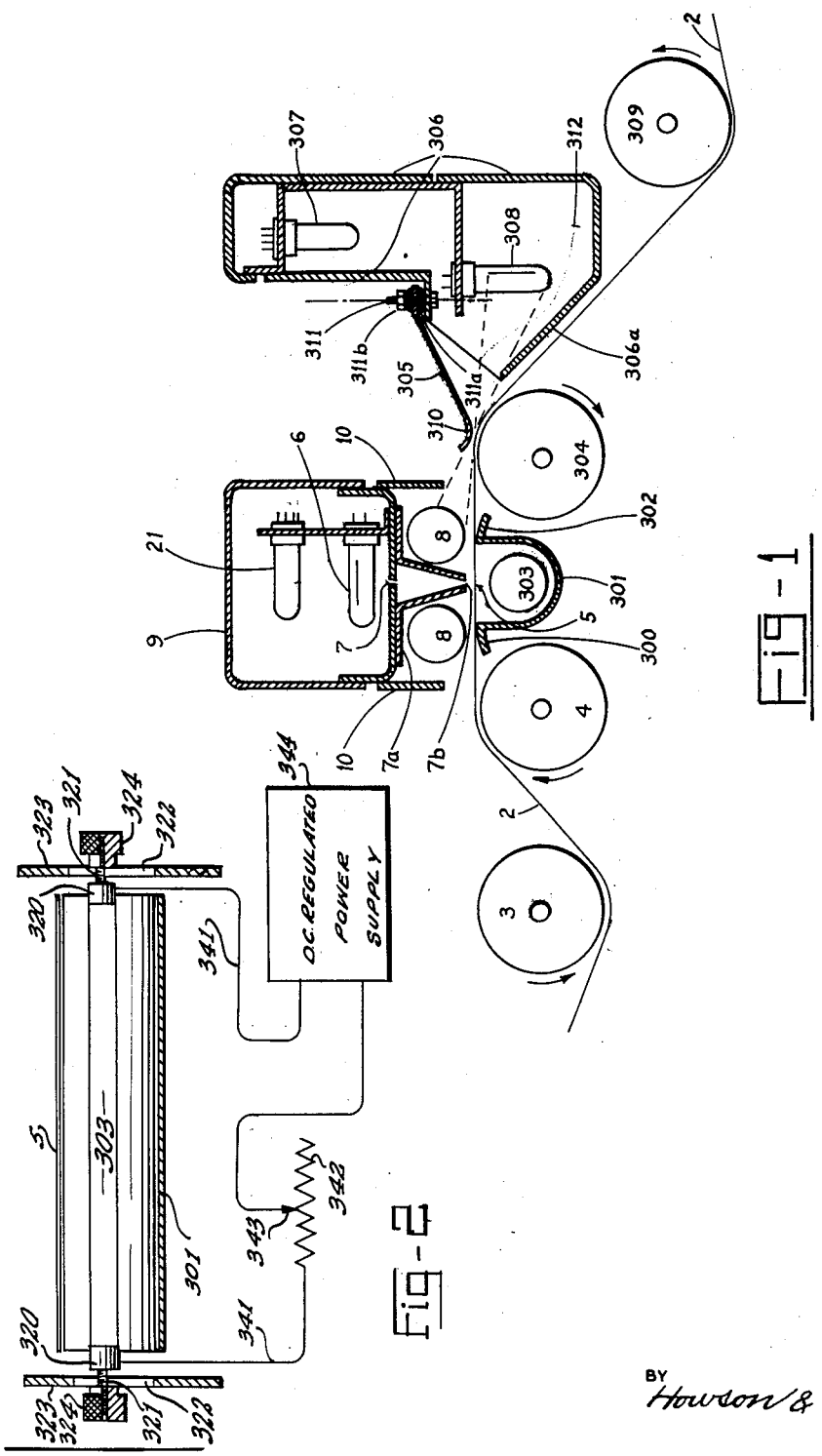
INVENTOR
PAUL NASH
BY Howson & Howson
ATTYS.

3,105,152
INSPECTION OF SHEET MATERIALS BY PHOTOELECTRIC MEANS
Paul Nash, 1132 Trent St., Ottawa, Ontario, Canada
Filed Jan. 8, 1960, Ser. No. 1,289
Claims priority, application Canada Jan. 12, 1959
18 Claims. (Cl. 250—219)

This invention relates to improvements in the detection, by photoelectric means, of defects in moving sheet materials such as paper, and is particularly concerned with improvements in the system disclosed in earlier copending United States application 806,349, filed April 14, 1959, as a continuation-in-part of my application 726,920, filed April 7, 1958, and now abandoned.

In this earlier application I disclosed a system in which the sheet material was conveyed over an inspection surface at which the upper surface of the material was flooded with light of substantially uniform intensity, the diffused light reflected from the illuminated section of material being passed through apertures formed in the light-tight housing of an inspection head positioned above the illuminated section, to fall upon photoelectric cells which generated electrical output signals whenever defects appeared in the inspected section which caused variations in the intensity of the reflected light.

In this earlier application I also mentioned that one of the requirements was to minimize as much as possible the signal variations generated in the photoelectric cells due to variations in the unblemished texture and composition of the material being inspected. To accomplish this I preferably employed D.C. fluorescent lamps equidistantly spaced on either side of the inspection head aperture so as to cause substantially uniform illumination to fall on the inspection surface from each side of the inspection head, which effectively reduced the signal variations or background "noise" due to changes in the surface smoothness of the inspected material; and also I employed a variety of inspection surfaces and surface finishes to reduce this noise.

As is explained more fully in my earlier application different types of inspection surfaces having different co-efficients of reflection and different finishes may be advantageously employed to reduce signals generated in the photoelectric devices due to variations in the texture and composition of the sheet material being inspected. When a relatively more opaque, though obviously not a completely opaque, material is being inspected such as a relatively high weight, white or light coloured paper, the material will have substantially uniform reflection characteristics in an unblemished condition, but there occur in such material localised transparent defects, or "shiners" as they are known in the trade, which must be detected. As simple experiment will show, such transparent defects are more readily apparent when the material is placed over a dark and non-reflecting surface than when they are placed over a surface having a high co-efficient of reflection. Accordingly for such types of material I prefer to use a dark and non-reflecting inspection surface.

For light weight relatively less opaque material such as thin paper, minor variations in the reflection characteristics of the inspected material are acceptable and accordingly with this type of material I prefer to use an inspection surface of relatively higher co-efficient of reflection, for example a white polished or gray inspection surface may be used to advantage with this type of material. Such a surface gives more nearly uniform reflection characteristics for the unblemished material whilst still permitting "shiners" to be detected.

In the system disclosed in my earlier application I illustrated an inspection surface in the form of a roller positioned immediately below the inspection head as one preferred form of inspection surface, and also I described a flat polished inspection surface as an alternative to the roller. I mentioned also that both of these inspection surfaces could be made readily exchangeable so as to provide a variety of surface finishes for different types of material.

This earlier form of interchangeable inspection surface, though useful, had certain draw-backs. The roller whilst it offered minimum frictional resistance to the sheet material was subject to axial and radial dissymmetry, the eccentricity thus produced being undesirable since it necessitated an adjustment of the sensitivity of the system so as to obviate the possibility of such eccentricity giving unwanted output signals. The flat polished surface obviously did not suffer from this disadvantage but had the draw-back that friction created between the surface and the inspected material tended to cause a significant build-up of static on the sheet material which in turn was highly undesirable. With both types of earlier surface it was necessary to stop the apparatus whilst changing the inspection surface.

In the present invention there is disclosed a simple and effective means of substantially reducing or eliminating the signal variations or "noise" appearing in the photoelectric devices due to variations in the texture and composition of the inspected unblemished material. Whilst intended primarily for use with my own inspection apparatus, the present invention may also be usefully employed with other of forms of inspection systems such as the scanner type of inspection head which operates on the flying spot scanner or television principle, and also with systems which utilize optical means either for conveying the light to the inspected surface or for conveying it from the inspected surface to the photoelectric devices.

Accordingly it is an object of the present invention, when employed in a system for detecting defects in sheets of non-opaque material wherein the material is moved past an inspection station at which photoelectric devices generate electrical signals in response to variations in the intensity of light emanating from one surface of that section of material passing the inspection station, to reduce the variations in the electric signals generated due to variations in the texture and composition of the inspected material, thus being done by illuminating the other surface of the section.

When formed according to the present invention, apparatus for detecting defects in sheets of non-opaque material such as paper comprises an inspection station, means for moving said material past said inspection station, first illumination means illuminating one surface of a section of said material passing said inspection station, said section extending transversely to the direction of motion of said material past said station, means at said inspection station, including at least one photoelectric device, for producing an electric signal in response to variations in the intensity of the light emanating from said section falling upon said photoelectric device, and second illumination means illuminating the other surface of said section whereby to reduce substantially the variations in said electric signal due to variations in the texture and composition of said material.

I have also found that the system disclosed in my earlier application is less effective than is desirable in detecting fine wrinkles or bumps appearing in the inspected material. This is because this type of defect mainfests itself as a very small surface elevation of the material which is normally flat and smooth, rather than as a discoluration, and accordingly does not produce any substantial change in the intensity of the reflected light, particularly with that form of my apparatus in which I use equal illumination from each side of the inspection head.

Accordingly it is a further object of this invention to provide means for detecting surface elevations, such as wrinkles, in moving sheets of normally smooth-surfaced material, such as paper, this being done by having the surface elevation raise a light gate member which otherwise yieldingly but continuously contacts the surface of the moving material, in which condition it interrupts the transmission of light from an illumination means to photoelectric means.

When formed according to the present invention apparatus for detecting surface elevations such as defects in moving sheets of normally smoothed surface material such as paper comprises light-gate means, including a light-gate member yieldingly contacting a surface of said moving sheet material, the line of contact of said member with said surface normally being continuous throughout its length, in the absence of any unwanted surface elevations, and extending in a direction transverse to the direction of motion of said material past said member, illumination means substantially uniformly illuminating one side of said line of contact, and detection means, including photoelectric devices responsive to light emanating from the other side of said line of contact, the appearance at surface elevations at said line of contact causing said member to yield and move away from said surface over at least part of its length, thereby interrupting said continuous contact and permitting light from said illumination means to reach said photoelectric devices.

The invention will now be described in conjunction with the accompanying drawings which are included by way of illustration and not of limitation. In these drawings:

FIGURE 1 depicts a cross-section in side elevation through inspection apparatus formed according to my invention; and FIGURE 2 shows in partial cross-section a detail of part of my apparatus used for varying the spacing and intensity of the means used to illuminate the lower surface of the inspected material.

In the drawings I have shown an inspection head formed according to the invention disclosed in my earlier application and accordingly for like parts I have attempted to use the same reference numerals as were employed in this earlier system. For parts peculiar to the present invention I have attempted to employ reference numerals 300 and above.

Referring to FIGURE 1 it will be seen that the sheet material 2 is drawn by spaced rollers 3, 4, 304 and 309 past an inspection station, intermediate rollers 4 and 304, whereat an inspection head comprising light tight housing 9 is positioned. Depending from the lower surface of housing 9 is an aperture member 7a having formed therein a narrow, elongated lower aperture 7b extending across the surface of the inspected material past the inspection station. This lower aperture co-operates with an aperture 7 formed in the lower surface of the light tight housing 9 to permit only light emanating from the inspected section 5 of the moving sheet material to reach photoelectric devices 6, groups of these photoelectric devices being coupled to a common output device such as cathode follower 21, whose output is connected to an amplifier (not shown) whereby to detect defects in a manner described in my earlier application.

The dimensions of the apertures can vary for different types of inspection apparatus, but as explained in my earlier application it is desirable to dimension the aperture so that the illuminated section observed by a group of photoelectric devices has a dimension in the direction of motion of the material past the inspection head of the same order of magnitude as the smallest fully black defect to be detected, and a dimension at right angles to this direction of motion which is several orders of magnitude greater than the average size of the average texture discontinuity in the material being inspected.

On each side of the aperture 7b are positioned D.C. fluorescent lamps 8 preferably supplied from a D.C. regulated source (not shown) which substantially uniformly illuminate the inspected section 5. Outwardly of these lamps 8 and secured to the light tight housing 9 are dependent flanges 10 which ensure that substantially the only direct light falling on the upper surface of the inspected section 5 is that received from the illumination lamps 8. Normally therefore the only light reaching the photoelectric devices 6 would be that reflected from the upper surface of inspected section 5. However as will be seen below these photoelectric devices may also receive light transmitted through the inspected material from illumination means positioned below the surface and accordingly the photoelectric devices may be said to be more properly responsive to light emanating from the inspected section, instead of merely to light reflected from the section which was the terminology employed in my earlier application.

In place of the roller or polished plate inspection surface shown in my earlier system, I now employ illumination means, preferably in the form of a fluorescent lamp 303 positioned immediately below the aperture 7b with its longitudinal axis extending co-extensive with this aperture, which illuminate the other, or lower, surface of the inspected section 4 of the sheet material passing the inspection station. Though lamp 303 is preferably employed to provide direct illumination of the lower surface of the inspected station 5, it would be possible to use an optical system to provide the illumination and not necessarily have the lamp shine directly on the lower surface.

Though the system will function if the lamp 303, or some similar illumination means, is used alone, the performance is improved if the lamp is used in conjunction with the U-shaped housing 301 which surrounds the lamp 303 and thus shields the lower surface of the inspection surface from substantially all light except that incident thereon from lamp 303.

I have found that any signal variations or "noise" generated in the photoelectric devices 6 by flutter or folds in the sheet material 2 as it passes through the inspected section 5 are reduced if the lower illumination means 303 is moved further away from the lower surface whilst maintaining the intensity of the illumination falling on this lower surface from this lamp at the desired level to provide a form of balance with the illumination of section 5 by the lamps 8. Accordingly the surface of the shield 301 facing lamp 303 is preferably polished so that more of the light from the lamp 303 is incident on the lower surface of the inspected section 5, thus permitting the lamp to be placed farther away from the lower surface for any given illumination intensity.

To minimize flutter and folds appearing at the inspected section 5 the shield 301 may also conveniently be provided with surfaces, in the form of outwardly extending flanges 300 and 302, which contact the lower surface of the moving sheet material, these flanges having a slight downward curvature so as to minimize any danger of their snagging the sheet material.

As mentioned above the intensity of illumination required on the lower surface of the inspected section 5 will vary for different types of material, and will even vary for the same material under certain conditions, such as for example arise when the same paper in one batch has a watermark, and in another batch does not have a watermark.

In the case when the paper does have a watermark it is necessary to adjust the intensity of illumination on the lower surface to the level where the watermark will not be detected as a defect which of course lessens the sensitivity of the system to transparencies of a nature similar to that of the watermark. If the watermark is not present then the system can be adjusted to a greater sensitivity, for example by reducing the intensity of the illumination of the lower surface so that defects having a degree of transparency comparable with that of the watermark will then be detected. Generally speaking the lower the intensity of illumination the greater will be the ability of the system to detect "shiners."

The tendency of the material passing the inspected section to flutter is of course in large measure dependent upon the spacing between the draw rollers 4 and 304 on each side of the inspection head, and this in turn is in large measure dependent upon the length of these rollers since the greater their length, the greater their diameter must be, and hence the greater the spacing between them. I have found that when the spacing between the rollers is only a few inches the use of contact surfaces provided on the shield 301 may be dispensed with, but that the use of these surfaces is of value at greater spacing, for example when the length of rollers 4 and 304 is greater than five feet, which means that their diameter increases to more than two inches.

Any conventional system may be employed to vary the intensity of the illumination on the other surface of the inspected section 5, but I prefer to employ either or both of two particular methods. One is to vary the intensity of lamp 303, and the second is to vary its distance from the lower surface of inspected section 5. Both of these functions may be usefully accomplished in the manner I have symbolically shown in FIGURE 2, which shows a partial cross-section of the inspected section 5, the lamp 303, the shield 301, and their supporting structure.

As shown in this figure the lamp 303 is provided with end caps 320 from which project threaded studs 321 passing through slots 322 formed in the upright side support members 323, which may conveniently be part of the supporting framework for the inspection apparatus.

Threaded onto the studs 321 are knobs 324 which when loosened permit the lamp 303 to be moved up or down in the slot 322 to the desired position when the knobs 324 are tightened and the lamp 303 thus fixed in any desired position.

Electrical energy is fed to the lamp 303 by leads 341 which enter through the insulated end caps 320 and which are connected via a variable resistor 342 to a D.C. regulated power supply 344. Varying the position of the contact 343 of variable resistor 342 causes the intensity of lamp 303 to vary.

Though a D.C. regulated power supply is preferred since variations in the intensity of illumination of the lower surface, such as would be caused by an A.C. or a non-regulated power supply, may effect the sensitivity of the system, it is nevertheless possible to use an A.C. source and other means for varying the intensity, such as a variable-tap autotransformer, without destroying the usefulness of my invention, particularly since these variations may be compensated for in other ways set forth in my earlier application.

In setting up the equipment the procedure normally employed is to set the system sensitivity, i.e. the overall gain of the detection system amplifiers, to a value corresponding to the degree of inspection required. With lower grade paper larger diameter fully black defects can be tolerated than in higher grade paper and accordingly the system sensitivity can be made lower.

With the sensitivity set, the output of the amplifier is observed on an oscilloscope, and the brightness and position of the lamp 303 adjusted until the observed noise level of the output is at or below a preferred level thus achieving the aforementioned balance. This preferred level must have a mean potential below that applied to the gate in the amplifier output, described more fully in my earlier application, which ensures that the detection system only generates an output pulse for defect signals above a predetermined level, and the value commonly chosen is one-third of this gate potential.

This preferred illumination intensity level may coincide with what might be termed the optimum intensity level, where signal variations due to variations in the transparency of the inspected material are substantially eliminated, but in general will be below this optimum level, which is desirable since it improves the ability of the system to detect certain types of defects such as holes.

As mentioned above a further feature of the present invention is the provision of apparatus for detecting unwanted surface elevations such as bumps or wrinkles in the moving sheet material. Though normally the system will be employed to detect inadvertently created surface elevations such as wrinkles, it could also be employed to detect artificially created surface elevations deliberately created in the surface of the material, for example, for control purposes.

The basic operating principle of this system is that a light gate member yieldingly contacts the surface of the moving material with the line of contact, in the absence of any unwanted surface elevations, being continuous throughout its length and extending traversely to the direction of motion of the material past the member. This light gate member normally interrupts the transmission of light from an illumination source, which illuminates the line of contact, to photoelectric means, but yields and moves away from the surface over at least a portion of its length when a surface elevation such as a wrinkle appears at the line of contact, thereby breaking the continuous contact and permitting light from the illumination source to reach the photoelectric means which then respond by generating an output signal.

Though the illumination means and the photoelectric devices could be positioned so that only light from the illumination source which was reflected from the material under the light gate member would reach the photoelectric devices when the member moved away from the surface, better results are obtained if the light from the illumination means is allowed to pass directly under the light gate member to reach the photoelectric devices when the member moves away from the surface.

The latter result is most easily achieved by curving the path of the moving sheet material, over at least a portion of its length, in the direction of motion of the material, which curvature, when the light-gate member is positioned at the curved portion, will enable the light transmitted from the illumination means passing under the light-gate member to reach the photoelectric devices by travelling in that plane tangential to the curved surface of the material passing through the line of contact between the light-gate member and the surface of the material.

Though optical means could be employed to off-set both the illumination means and the photoelectric devices from this plane, it is more convenient to have both the illumination source and the photoelectric devices actually positioned in this tangential plane so that light travels directly from the illumination source to the photoelectric device when the light-gate member moves away from the surface.

Such a system is shown in FIGURE 1. The necessary curvature in the path of the moving sheet material is imparted by off-setting roller 309 below the plane passing through the axes of rollers 4 and 304. The degree of off-set of roller 309 and the position of roller 304 is arranged so that the wrinkle detector may employ as its associated illumination means, one of the lamps 8 used in the defect detector head. Of course separate illumination means could be employed but it is expedient and convenient to use the lamp already provided. It will also be appreciated that the wrinkle detector could be quite readily positioned on the other side of the defect head and the other lamp 8 used in conjunction with roller 3 to provide the necessary illumination and curvature.

The light-gate member, forming part of the over-all light-gate means, which provides the actual interruption of the light from the lamp 8 is shown here as an inclined plate 305 which contacts the curved portion of the forward path of the sheet material 2, in a straight edge 310 extending at right angles to the direction of motion of the material. A slight upward curvature on the end of the light-gate member 305 ensures that it does not snag the sheet material.

Normally the moving sheet material will be smooth and flat and so the light-gate member will have a straight contacting surface in order to provide the necessary continuous contact. However in certain circumstances this contacting surface could be curved not straight, for example the roller 304 could be provided with a slight axial curvature in its outer surface, in which case the lower edge of the light-gate member 305 would be curved to conform to this curvature. The basic requirement may be more simply stated that the line of contact between the light-gate member and the upper surface of the material must be continuous throughout the length of the line of contact in the absence of any unwanted surface elevations.

Though shown here as connected to the light-tight housing which houses the photoelectric devices, the light-gate member 305 could be independently mounted, the basic requirement being that the light-gate member must provide a continuous contact with the surface of the material in the absence of any unwanted surface elevations, and that such contact must be yielding so that the light-gate member will move away from the surface when an unwanted surface elevation such as a wrinkle appears, so that light may pass to the photoelectric devices.

This yielding contact may be achieved in a variety of ways. One such way would be to make the member 305 itself flexible for example it could be made of a thin metal or plastic, with the lower edge 310 stiffened or thickened to ensure good contact. Alternately as is shown here the light-gate member 305 may be relatively inflexible but be resiliently mounted so as to provide the yielding contact. In the present case this is done by resilient mounting means 311 comprising a nut and bolt combination 311b provided with a rubber grommet 311a which is fitted into an aperture in the light-gate member 305 and thus provides resilient mounting for this member in the manner commonly employed in automobile shock absorbers.

Photoelectric cells 308 are positioned in the tangential plane passing through the line of contact of the lower edge 310 of member 305 with the curved portion of the sheet material, and the lamp means 8, so that these photoelectric cells receive direct light from the lamp means 8 when the light-gate member 305 moves away from the surface of the material due to the appearance of a surface elevation such as a wrinkle at the line of contact of the light-gate member with the surface of the material.

Though it could be dispensed with in certain conditions, such as in the event that the equipment was operated in an otherwise dark room, it is preferred to position the photoelectric cells 308 in a light tight housing 306 which has an aperture formed in that side wall facing the light-gate member. For the equipment as shown this aperture is formed between an inclined lower flange 306a, extending parallel and adjacent the surface of the material between rollers 304 and 309, and the light-gate member 305 itself. The use of this light tight housing and its associated aperture excludes from the photoelectric cells 308 substantially all light except that passing under the light-gate member 305 and thus permits a reasonable level of ambient lighting to be employed.

Also mounted in the light tight housing 306 are output devices such as anode or cathode followers 307 which accept the output from one or more photoelectric cells 308 connected in parallel and pass it to the remainder of the detection apparatus which may conveniently be the same as that described in my earlier application referred to above.

As mentioned previously light-gate member 305 is resiliently connected to this light-tight housing so as to provide the necessary yielding contact between the light-gate member and the surface of the material, and also to enable the aperture in the housing to be formed as closely as possible to the line of contact between the light-gate member and the surface of the material.

To give better results I prefer to limit the length of the line of contact between the light-gate member and the surface to a few inches at a direction at right angles to the direction of motion of the sheet material, and accordingly to cover any given width of material I may use several tandem light-gate members to provide full coverage across the width of the inspected sheet. Thus for example in the case of sheet material 17 inches width I prefer to use four light-gate members each 4.25 inches wide.

In my application No. 806,349 I disclosed how the outputs from two separate groups of photoelectric cells in a detection head can be respectively coupled to the two input electrodes of a balanced push-pull amplifier, so as to make the system unresponsive to condition changes effecting both groups of cells simultaneously, e.g. a flicker in the lamps illuminating the cells, which would otherwise register as a defect.

This arrangement can also be used to advantage in the wrinkle detection system described above, with one or more light-gate members being associated with one or more photoelectric cells connected in parallel to form what is defined as a gate-group, and pairs of gate-groups being connected to the input electrodes of a balanced push-pull amplifier preferably of the long-tailed pair type.

Shading members in the form of partitions 312 are introduced into the light tight housing 306 when more than one gate-group is employed. These partitions substantially shield the photocells of any one gate-group from light passing under the light-gate members of an adjacent gate-group.

In the example given above of four light-gate members each 4.25 inches long covering a 17 inch sheet, I have employed one central partition 312 in the light tight housing 306 and used one photocell with each pair of light-gate members 305 on each side of this partition, thereby forming two gate-groups each having two light-gate members associated with one photocell.

Embodiments of my invention other than that disclosed and described here may be made without departing from the spirit and scope of my invention as defined in the appended claims.

I claim:

1. Apparatus for detecting defects in sheets of non-opaque material comprising an inspection station, means for moving said material past said inspection station, first illumination means illuminating one surface of a section of said material passing said inspection station, said section extending transversely to the direction of motion of said material past said station, means at said inspection station, including at least one photoelectric device for producing an electric signal substantially only in response to variations in the intensity of the diffused light emanating from said section falling upon said photoelectric device, second illumination means illuminating the other surface of said section to balance the illumination of said section by said first illumination means with light of substantially uniform intensity, and means for adjusting said balance to minimize the variations in said electric signal due to variations in the texture and composition of said material.

2. Apparatus according to claim 1 wherein said means for adjusting said balance includes means for adjusting and setting the intensity of the illumination of said other surface by said second illumination means.

3. Apparatus according to claim 2 wherein said means for varying the intensity of illumination of said other surface by said second illumination means comprise means for varying both the intensity of said second illumination means and its distance from said other surface.

4. Apparatus according to claim 1 which further includes shielding means surrounding said second illumination means and effective to shield said other surface from substantially all incident light except that from said second illumination means.

5. Apparatus for detecting defects in sheets of non-opaque material comprising an inspection head having a lower surface parallel to one surface of said sheet material, means for conveying said sheet material past said inspection head, means defining an elongated narrow aperture in said lower surface extending transversely to the direction of motion of said material past said inspection head, first illumination means illuminating said one surface of that section of said material adjacent said aperture with light of substantially uniform intensity, photoelectric means in said inspection head responsive to substantially only light emanating from said illuminated section of material, and second illumination means illuminating the other surface of said section of material with light of substantially uniform intensity whereby substantially to reduce variations in the electric signals generated in said photoelectric means due to variations in the texture and composition of said non-opaque material.

6. Apparatus according to claim 5 which further includes means shielding said other surface of said section from substantially all incident light except that from said second illumination means.

7. Apparatus for detecting defects in sheets of non-opaque material of substantially uniform reflection characteristics comprising an inspection head having a lower surface parallel to one surface of said sheet material, means for conveying said sheet material past said inspection head, means defining an elongated narrow aperture in said lower surface extending transversely to the direction of motion of said material past said inspection head, first and second illumination means positioned respectively on each side of said aperture and illuminating said one surface of that section of said material immediately adjacent said aperture with light of substantially equally uniform intensity from each side of said aperture, photoelectric means in said inspection head responsive to substantially only light emanating from said illuminated section, third illumination means positioned adjacent the other surface of said illuminated section and illuminating said other surface of said section with light of substantially uniform intensity, and means shielding said other surface of said section from substantially all except incident light from said third illumination means.

8. Apparatus according to claim 7 wherein the surface of said shielding means facing said third illumination means has a high co-efficient of reflection.

9. Apparatus for detecting defects in sheets of non-opaque material comprising an inspection head having a light-tight housing formed with a lower surface extending parallel to one surface of said sheet material, means for conveying said sheet material past said inspection head, means defining an elongated narrow aperture in said lower surface extending transversely to the direction of motion of said sheet material past said inspection head, photoelectric means in said light-tight housing responsive to light, passing through said aperture, emanating from a section of said one surface of said sheet material adjacent said inspection head, the dimension of said inspected section in the direction of motion of said sheet material being of the same order of magnitude as the diameter of the smallest fully black defect to be detected, and the dimension of said inspected section in a direction transverse to said direction of motion being several orders of magnitude greater than the average texture discontinuity of said sheet material, first and second identical illumination means positioned on each side of said aperture and equidistant from said inspected section, third illumination means illuminating the other surface of said inspected section with light of substantially uniform intensity, shielding means surrounding said third illumination means and effective to shield said other surface of said inspected section from substantially all light except that incident thereon from said third illumination means, the intensity and distance from said other surface of said third illumination means being variable, whereby substantially to reduce the signals generated in said photoelectric means by variations in the texture and composition of the sheet material.

10. Apparatus according to claim 9 wherein said shielding means are provided with surfaces engageable with said other surface of said inspected section, whereby to restrict flutters and folds occurring in said inspected section.

11. Apparatus according to claim 9 wherein said means for conveying said sheet material past said inspection head includes contact surfaces engaging said sheet material on each side of said inspection head and effective to substantially reduce any flutters or folds occurring in said sheet material as it is moved past said inspection head.

12. Apparatus according to claim 5 wherein said first and second illumination means are tubular fluorescent lamps supplied from a regulated direct current power supply.

13. Apparatus according to claim 1 wherein light from said first illumination means passes tangentially over the surface of a section of said material curved away from said inspection station in said direction of motion, and said apparatus further comprises a light-tight housing having an aperture formed in an outer wall thereof, through which said light from said first illumination means tangential to said surface can enter said housing, and light-gate means including a light-gate member yieldingly contacting said surface of said curved section, the line of contact of said member with said surface being continuous throughout its length and extending at right angles to said direction of motion whereby to interrupt the transmission of light from said first illumination means to said aperture, the appearance of surface elevations at said line of contact causing said member to yield and move away from said line of contact over at least part of its length thereby interrupting said continuous contact and permitting light from said first illumination means to reach said photoelectric devices.

14. Apparatus for detecting surface elevations, such as wrinkles, in moving sheets of normally smooth surfaced material, such as paper, comprising light-gate means, including a light-gate member yieldingly contacting a surface of said moving sheet material, the line of contact of said member with said surface normally being continuous throughout its length, in the absence of any unwanted surface elevations, and extending in a direction transverse to the direction of motion of said material past said member, illumination means substantially uniformly illuminating one side of said line of contact, and detection means, including photoelectric devices responsive to light emanating from the other side of said line of contact, the appearance of surface elevations at said line of contact causing said member to yield and move away from said surface over at least part of its length, thereby interrupting said continuous contact and permitting light from said illumination means to reach said photoelectric devices.

15. Apparatus for detecting surface elevations, such as wrinkles, in sheets of normally smooth surface material, such as paper, moving over an inspection surface curved, over at least a portion of its length, in the direction of motion of said material over said surface, comprising light-gate means including a light-gate member positioned at said curved portion of said inspection surface yieldingly contacting the surface of said moving sheet material, the line of contact of said member with said surface normally being continuous throughout its length and extending in a direction transverse to the direction of motion of said material past said member, illumination means positioned to one side of said member and substantially uniformly illuminating said line of contact, and detection means, including photoelectric devices responsive to light transmitted to them from said illumination means passing directly between said light-gate member and said contacted surface, the appearance of surface elevations at said line of contact causing said member to yield and move away from said surface over at least part of its length, thereby interrupting said continuous contact and permitting light from said illumination means to pass directly under said light-gate member and reach said photoelectric devices.

16. Apparatus for detecting surface elevations, such as wrinkles, in moving sheets of normally smooth surfaced material, such as paper, moving over an inspection surface curved, over at least a portion of its length, in the direction of motion of said material over such surface, comprising a light-gate member yieldingly contacting a surface of said moving sheet material at said curved portion, the line of contact of said member with said surface normally being continuous throughout its length, in the absence of any surface elevations, and extending at right angles to the direction of motion of said material over said surface, lamp means positioned in that plane tangential to said curved surface passing through said line of contact, a light-tight housing having an outer wall parallel to, and coextensive with, said line of contact, means defining an aperture in said outer wall, said aperture being formed in said plane and coextensive with said line of contact throughout the length thereof, and photoelectric devices positioned in said housing responsive to light entering said housing through said aperture, the appearance of surface elevations at said line of contact causing said member to yield and move away from said surface over at least part of its length thereby interrupting said continuous contact and permitting light from said lamp means to reach said photoelectric devices.

17. Apparatus according to claim 16 wherein said light member is resiliently connected to said light-tight housing.

18. Apparatus according to claim 16 which includes a plurality of said light-gate members extending tandem in a line across said sheet material, at least one of said members being associated with at least one of said photoelectric devices to form a gate group, and shading members in said light-tight housing effective to make the photoelectric devices of any one gate group responsive to substantially only light passing under the light-gate members associated with said one gate group.

References Cited in the file of this patent

UNITED STATES PATENTS

| | | |
|---|---|---|
| 1,774,759 | Owens | Sept. 2, 1930 |
| 1,828,000 | Ranger | Oct. 20, 1931 |
| 2,078,800 | Juchter | Apr. 27, 1937 |
| 2,285,296 | Maul | June 2, 1942 |
| 2,429,331 | Sachtleben | Oct. 21, 1947 |
| 2,438,588 | Tolson | Mar. 30, 1948 |
| 2,753,464 | Stone | July 3, 1956 |
| 2,773,412 | Hock | Dec. 11, 1956 |
| 2,988,219 | Bartlett | June 13, 1961 |
| 3,023,900 | Thier | Mar. 6, 1962 |